United States Patent
Kathan et al.

(10) Patent No.: US 8,622,718 B2
(45) Date of Patent: Jan. 7, 2014

(54) PUMP ELEMENT, HYDRAULIC BLOCK WITH PUMP ELEMENT, AND INSTALLATION METHOD

(75) Inventors: Nicole Kathan, Leutkirch (DE); Ludger Hermanns, Munich (DE); Marc Zimmermann, Oberstenfeld (DE)

(73) Assignee: Robert Bosch GmbH, Stuttgart (DE)

( * ) Notice: Subject to any disclaimer, the term of this patent is extended or adjusted under 35 U.S.C. 154(b) by 852 days.

(21) Appl. No.: 12/742,668

(22) PCT Filed: Sep. 24, 2008

(86) PCT No.: PCT/EP2008/062723
§ 371 (c)(1),
(2), (4) Date: Jul. 8, 2010

(87) PCT Pub. No.: WO2009/062776
PCT Pub. Date: May 22, 2009

(65) Prior Publication Data
US 2010/0276234 A1 Nov. 4, 2010

(30) Foreign Application Priority Data
Nov. 13, 2007 (DE) .......................... 10 2007 054 097

(51) Int. Cl.
*F04B 53/14* (2006.01)
(52) U.S. Cl.
USPC .................. 417/313; 417/460; 303/119.2
(58) Field of Classification Search
USPC ................ 303/115.4, 116.4, 119.1–119.3; 417/545, 549, 460, 469, 470, 413
See application file for complete search history.

(56) References Cited

U.S. PATENT DOCUMENTS

| 6,217,300 | B1 | 4/2001 | Schuller et al. |
| 6,224,352 | B1 * | 5/2001 | Hauser et al. ................ 417/313 |
| 6,514,055 | B1 * | 2/2003 | Schuller ........................ 417/460 |
| 6,520,756 | B1 * | 2/2003 | Alaze ............................ 417/441 |
| 2006/0198738 | A1 * | 9/2006 | Schlitzkus et al. ............ 417/312 |

FOREIGN PATENT DOCUMENTS

| DE | 19854716 A1 | 5/2000 |
| DE | 19918127 A1 | 10/2000 |
| EP | 1022467 A2 | 7/2000 |
| JP | 2001-501282 A | 1/2001 |
| JP | 2005-264843 A | 9/2005 |
| JP | 2006-274996 A | 10/2006 |
| WO | WO2004088137 A1 | 10/2004 |

* cited by examiner

*Primary Examiner* — Christopher Schwartz
(74) *Attorney, Agent, or Firm* — Maginot, Moore & Beck

(57) ABSTRACT

The invention relates to a pump element for installation in a pump bore of a hydraulic block, which includes a pump plunger, a restoring spring for the pump plunger, and an inlet valve having an inlet valve cover, in which a closing spring and a closing body are arranged. According to the invention, the inlet valve cover has a high pressure sealing section, which rests against the valve seat element in the axial direction with spring force support provided by the restoring spring. The valve seat element is positively connected to the pump plunger at least before installation of the pump element in the pump bore. Centering elements are provided for centering the inlet valve cover relative to the valve seat element. The invention further relates to a hydraulic block and to an installation method.

20 Claims, 2 Drawing Sheets

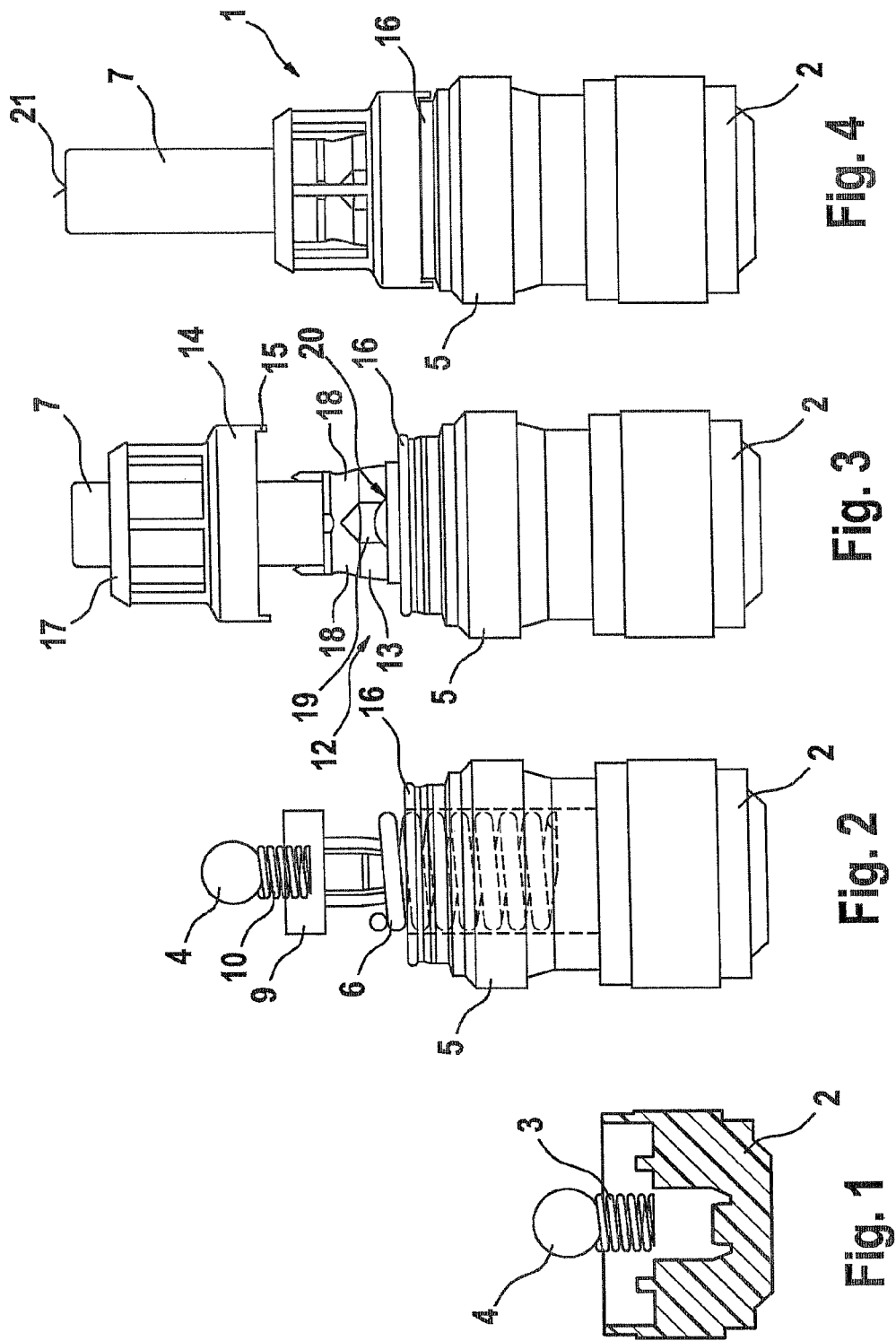

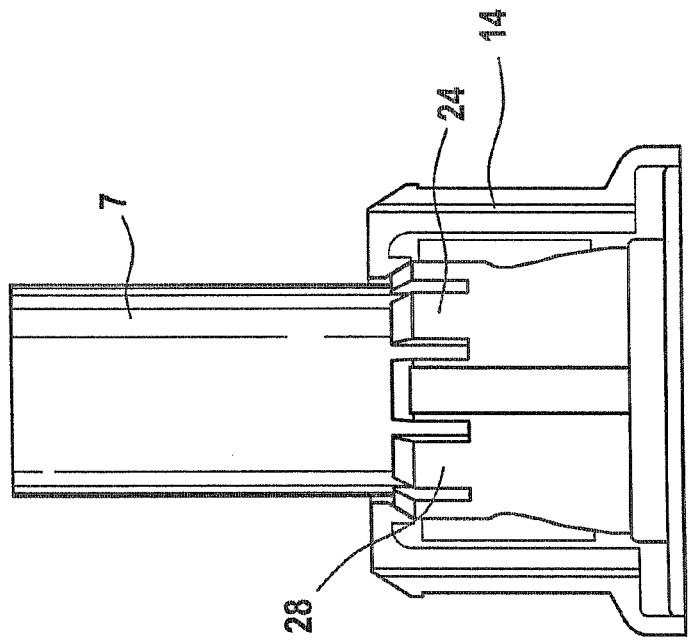
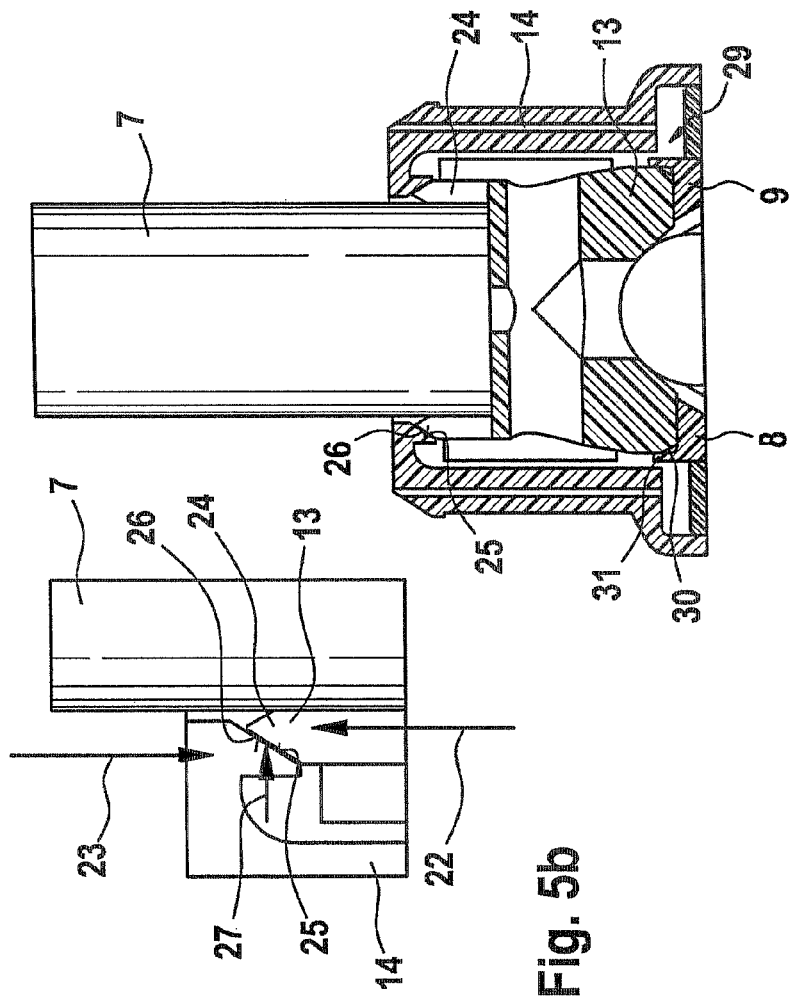

PUMP ELEMENT, HYDRAULIC BLOCK WITH PUMP ELEMENT, AND INSTALLATION METHOD

CROSS-REFERENCE TO RELATED APPLICATION

This application is a 35 USC 371 application of PCT/EP2008/062723 filed on Sep. 24, 2008.

BACKGROUND OF THE INVENTION

1. Field of the Invention

The invention relates to a pump element for installation in a pump bore of a hydraulic block, to a hydraulic block for a brake system of a motor vehicle, and to an installation method for a pump element.

2. Description of the Prior Art

Piston pumps received in a hydraulic block are used in hydraulic vehicle brake systems of motor vehicles and are often called return pumps. In traction control, they serve to lower or raise the brake pressure in the wheel brake cylinders selectively, to enable regulating the brake pressure in the wheel brake cylinders.

Known piston pumps have a pump element which must first be installed before it can be fixed in a pump bore of a hydraulic block. In known pump elements, the last installation step before installing the pump element in the pump bore of the hydraulic block is joining together a preassembled piston assembly, which has an inlet valve, and a preassembled outlet valve assembly. The two assemblies, mounted on separate assembly belts, are fixed to one another by means of a filter element, and the filter element radially outwardly surrounds one portion of the piston assembly and is affixed to a cylinder element of the outlet valve assembly.

In the known pump element and the installation method for installing the known pump element, it is disadvantageous that at least two assembly belts are needed in order to mount the two assemblies separately. The installation is moreover complicated because it is necessary to produce many pressure bonds, so that the assemblies that are separate from one another will form stable units that do not fall apart. For instance, in the case of the piston assembly, a pressure bond must be made between a high-pressure seal, affixed to the pump piston by means of a press fit, and an inlet valve cap.

OBJECT AND SUMMARY OF THE INVENTION

The object of the invention is to propose a pump element which is simple to install, preferably in a purely forward direction. Moreover, the object is to propose a hydraulic block having a correspondingly optimized pump element. The object further comprises proposing a simplified installation method for installing a pump element.

This object is attained with regard to the pump element according to the invention, with regard to the hydraulic block according to the invention, and with regard to the installation method according to the invention.

The invention is based on the concept of no longer embodying the high-pressure seal as a separate component from the inlet valve cap but rather embodying it in one piece with the inlet valve cap, so that the high-pressure seal forms a portion, preferably oriented toward the pump piston, of the inlet valve cap. What is essential is that the inlet valve cap, preferably with its high-pressure sealing portion, is pressed, with the aid of the restoring spring for the pump piston that acts on the inlet valve cap, preferably directly on the high-pressure sealing portion, in the axial direction against a valve seat element. In contrast to the known pump elements, the valve seat element of the invention is embodied as a separate component from the pump piston and is preferably of plastic. In particular, it is an injection-molded part. In order that the pump element, after its assembly and before its introduction into the pump bore, will form a stable unit whose components are held firmly together in such a way that unintended loosening of components before or during the assembly is avoided, it is provided according to the invention that the pump piston, at least before the installation of the pump element in the pump bore, is connected by nonpositive engagement to the valve seat element. In other words, the valve seat element is affixed to the pump piston, so that a tensile load can be exerted on the pump piston without the pump piston coming (directly) loose from the valve seat element. In order, with a pump element embodied in this way, to enable installation of the components of the pump element in the axial direction without the necessity of first assembling two separate assemblies and then putting them together, it is an essential characteristic of a pump element embodied in accordance with the concept of the invention that centering elements, which make easier finding of the components relative to one another possible, are provided on the high-pressure sealing portion and/or on the valve seat element. Preferably, the valve seat element after its installation protrudes into the inlet valve cap or into the high-pressure sealing portion of the inlet valve cap in the axial direction.

A pump element embodied according to the concept of the invention has considerable advantages over known pump elements for hydraulic brake systems. For instance, the complexity of the installation system can be reduced, since a pump element embodied in accordance with the concept of the invention can be installed entirely in one piece using forward installation, that is, installed in the axial direction. Moreover, greater flexibility in terms of the type of pump piston portion of the pump element is obtained, especially because the valve seat element is a separate component affixed to the pump piston. Since an assembly belt can be dispensed with, the space in the entire assembly line is reduced because of the invention. Furthermore, greater scalability of the assembly line is obtained. Moreover, a pump element embodied in accordance with the concept of the invention can be handled entirely as bulk material. One essential advantage of a pump element of the invention is that intermediate assembly steps and subsidiary units are eliminated, and the assembly steps per se are simplified. Moreover, the production costs for a pump element embodied in accordance with the concept of the invention are reduced markedly in comparison to known pump elements.

An embodiment of the pump element in which the inlet valve cap, and in particular its high-pressure sealing portion, rests solely on the valve seat element is advantageous. In other words, an embodiment, particularly for attaining forward installation of the entire pump element, in which a connection by nonpositive engagement between the inlet valve cap and the valve seat element is dispensed is advantageous. Expressed in still other words, in a refinement of the invention it is provided that the inlet valve cap rests without fixation on the valve seat element, so that the connection (purely contact) of the inlet valve cap and valve seat element cannot absorb any tensile forces. In this way, a pressure bond is dispensed with; in forward installation, a pressure bond would be problematic, because the abutment for exerting a contrary force to attain a sufficiently heavy-duty pressure bond, in purely forward installation, would have to be the restoring spring for the pump piston.

An embodiment of the pump element in which the centering elements with which the valve seat element can be centered relative to the inlet valve cap include at least one chamfer is of particular advantage. Preferably, this chamfer is made on an end region, toward the inlet valve cap, of the valve seat element; the chamfer serves to facilitate finding a receiving portion in the inlet valve cap, and this portion is formed by a preferably encompassing circumferential wall portion of the inlet valve cap or of the high-pressure sealing portion.

An especially preferable embodiment is one in which the inlet valve and the pump piston affixed to the valve seat of the inlet valve are retained by means of a filter element on a cylinder element, and the cylinder element receives the restoring spring for the pump piston within itself. The restoring spring is braced axially on the inlet valve cap, preferably on its high-pressure sealing portion, and thus presses the inlet valve cap against the valve seat element. The valve seat element in turn is pressed by the spring force of the restoring spring axially against a filter element, preferably against a bottom portion of the filter element, and the filter element absorbs this spring force since it is retained on the cylinder element, preferably by means of a detent connection.

For embodying the nonpositive-engagement connection between the valve seat element and the pump piston, the most various possibilities exist. An embodiment in which the pump piston is received in a receptacle of the valve seat element and a clamping bond is attained is preferred. It is especially preferable if this clamping bond between the pump piston and the valve seat element is attained via a radial force component, which results from the exertion of spring force on the valve seat element in the axial direction and the bracing of the filter element and the valve seat element relative to one another on at least one oblique contact face. The result of the exertion of axial force by the restoring spring is thus a radially inward-oriented contact pressure, with which an encompassing circumferential wall portion, preferably comprising a plurality of subsidiary portions that in particular are flexible, is pressed in the radial direction inward against the circumferential wall of the pump piston.

Independently of the variant fastening described above, in addition or alternatively a pressure bond can be attained between the pump piston and the valve seat element. For instance, the pump piston and the valve seat element can protrude axially into one another for that purpose, and the contrary force upon axial joining is made available for the pump piston by the restoring spring. In addition or alternatively, the pump piston connected by nonpositive engagement to the valve seat element in the radial direction. The contrary force upon radial pressing can be attained by means of a pair of assembly tongs that exerts pressure inward in the radial direction on the valve seat element. One possible embodiment provides for installing the pressure bond in a separate assembly unit and then forward-installing the component, now comprising the pump piston and the valve seat element, on the inlet valve cap. However, an embodiment in which the assembly of all the components of the pump element is done in forward installation, that is, in succession in the axial direction, is preferred.

Instead of a pressure bond, an adhesive bond can also be attained between the pump piston and the valve seat element. In it, the pump piston can be connected axially and/or radially to the valve seat element by means of adhesive.

The invention also leads to a hydraulic block for a brake system of a motor vehicle, in which a pump element as described above is received in a pump bore inside the hydraulic block and advantageously cooperates with a rotatable eccentric element. The axis of rotation of the eccentric element preferably extends at a right angle to the longitudinal center axis of the pump piston. Preferably, when the pump element is received in the pump bore, the valve seat element no longer rests on the filter element.

The invention also leads to an installation method for a pump element, preferably for a pump element as described above. According to the invention, the installation method includes the steps of axially thrusting the inlet valve cap, with the high-pressure sealing portion embodied on it, onto a restoring spring, which is received in a cylinder element that in particular is compressed by a closure cap. Next, a closing spring and after that a closing body are introduced in the axial direction into the inlet valve cap. This is followed by axially thrusting a valve seat element onto the inlet valve cap, preferably onto the high-pressure sealing portion of the inlet valve cap. An embodiment in which the pump piston is installed in the axial direction only after the valve seat element has been thrust on is especially preferred. However, an embodiment in which the pump piston together with the valve seat element already affixed to it is made to rest on the inlet valve cap in the axial direction is also attainable.

An embodiment of the installation method in which all the components of the pump element are installed in forward installation is especially preferred. This embodiment makes it possible to equip the assembly belt in tempo. This means that while one pump element is being assembled on an assembly belt, the assembly of a further pump element has already begun.

An especially preferable embodiment of the installation method is one in which, as the final assembly step of the pump element before the introduction of the pump element into a pump bore in a hydraulic block, a filter element is thrust onto the pump piston and press-fitted onto a cylinder element, in such a way that the filter element is connected to the cylinder element by nonpositive engagement, in particular via a detent connection, so that the filter element can absorb axial forces exerted on it by the valve seat element, the axial forces being the result of the exertion of spring force on the inlet valve cap by the restoring spring.

BRIEF DESCRIPTION OF THE DRAWINGS

Further advantages, characteristics and details of the invention will become apparent from the ensuing description of preferred exemplary embodiments and from the drawings. In the drawings:

FIGS. 1 through 4 show different assembly steps in forward installation of a pump element;

FIG. 5a is a fragmentary detail of the pump element, showing one possible nonpositive-engagement connection, embodied as a clamping bond, between the pump piston and the valve seat element;

FIG. 5b is an enlarged detail of FIG. 5a; and

FIG. 6 shows a detail of a fully installed pump element.

DESCRIPTION OF THE PREFERRED EMBODIMENTS

In the drawings, identical components and components having the same function are identified by the same reference numerals.

In conjunction with FIGS. 1 through 4, an optimized installation method, in which all the components of a pump element 1 (see FIG. 4) are assembled in forward installation, will be described below.

It can be seen from FIG. 1 that first, an outlet valve cap 2 is placed on a tool holder, not shown. The outlet valve cap 2 is equipped in the axial direction with an outlet valve closing spring 3 and with an outlet valve closing body 4, embodied as a ball.

From FIG. 2, it can be seen that next, a cylinder element 5 is connected by nonpositive engagement to the outlet valve cap 2 by being pressed into it. Next, the cylinder element 5 is equipped in the axial direction with a restoring spring 6 for the pump piston 7 that can for instance be seen in FIG. 4. A cup-shaped inlet valve cap 8 (FIG. 5a) is countersunk in portions in the axial direction into the restoring spring 6, and the inlet valve cap 8, on its end remote from the cylinder element 5, has a high-pressure sealing portion 9 which in the assembled state cooperates in sealing fashion with the inside circumference of the cylinder element 5.

After that, the inlet valve cap is equipped in the axial direction with a closing spring 10 and a closing body 11, embodied as a ball, of an inlet valve 12 (see FIG. 2).

After the equipping of the inlet valve cap 8 with the closing spring 10 and the closing body 11, a valve seat element 13 (see FIG. 3) is placed in the axial direction on the inlet valve cap, whereupon the pump piston 7 is introduced in the axial direction by its end portion into the valve seat element 13 and connected to it by nonpositive engagement. In an alternative embodiment of the installation method, before the valve seat element 13 is placed on the inlet valve cap 8, the pump piston 7 is connected in a separate assembly device to the valve seat element 13 by nonpositive engagement.

As the final assembly step, a sleevelike filter element 14 is thrust in the axial direction onto the pump piston 7 and affixed with the aid of detent hooks 15 by positive engagement on a collar 16 of the cylinder element 5. In the assembled state, the restoring spring 6 urges the valve seat element 13 in the axial direction against a bottom portion 17 of the filter element 14, which is capable of absorbing this axial force since it is connected to the cylinder element 5 by positive engagement via the detent hooks 15.

In FIG. 3, transverse conduits 18 in the valve seat element 13 are shown, which communicate with the bottom of the central blind bore 19 in the valve seat element 13. Fuel flows radially inward into the hydraulic block, not shown, through the filter element 14 to the transverse conduits 18, through them to the blind bore 19, and through it in the axial direction to the closing body 11. As can be seen from FIG. 3, the face-end valve seat 20 of the inlet valve 12, which is embodied on the valve seat element 13, is shaped as an internally conical valve seat.

The pump element 1 shown in FIG. 4 that is obtained after assembly is capable of being handled like bulk material. The pump element can be received in a pump bore of a hydraulic block. Inside the hydraulic block, the free face end 21 of the pump piston 7 cooperates with an eccentric element, which is driven rotatably and drives the pump piston 7 to an axial reciprocating motion; the restoring spring 6 ensures a corresponding axial reverse motion. The hydraulic block, not shown and known per se, includes besides the pump element 1 still other components, not shown, of traction control in a hydraulic vehicle brake system, such as solenoid valves, check valves, and hydraulic reservoirs that are interconnected with one another. The hydraulic block forms a pump housing for the pump element 1.

In FIGS. 5a and 5b, in respective sectional views, a detail of an assembled pump element 1 is shown; from FIGS. 5a and 5b, one possible nonpositive-engagement connection, embodied as a clamping bond, between the pump piston 7 and the valve seat element 13 can be seen. Alternative nonpositive-engagement connections, described in the more general portion of this specification, can be attained as an alternative or in addition.

In FIGS. 5a and 5b, an arrow 22 indicates the axial force exerted by the restoring spring on the valve seat element 13. This axial force acts counter to a retention force 23, which results from the nonpositive-engagement connection of the filter element 14 with the cylinder element 5. On an annular axial extension 24 (or circumferential wall portion), an oblique contact face 25 is disposed radially on the outside; it cooperates with a congruently shaped oblique contact face 26 radially on the outside of the filter element 14. Because of the oblique bracing of the valve seat element 13 and of the filter element 14 on one another, a radial force component 27 is created, which with force urges the axial extension 24 radially inward against the pump piston 7. Accordingly, the pump piston 7 is clamped in the radial direction (clamping bond).

From FIG. 5a it can be seen that centering means 29 are provided, with which the valve seat element 13 can be centered relative to the inlet valve cap 8. The centering means 29 includes an encompassing, terminal chamfer 30 on the valve seat element 13, and the chamfer cooperates with an axially pointing lower wall portion 31 of the high-pressure sealing portion 9 of the inlet valve cap 8.

As can be seen from FIG. 6, the axial extension 24 (or circumferential wall portion) is formed by a plurality of circumferentially spaced-apart subsidiary portions 28, which radially on the outside have an oblique contact face 25 (FIG. 5a) that cooperates with a corresponding contact face 26 of the filter element 14, so that the subsidiary portions 28 are adjusted spring-elastically radially inward onto the pump piston 7.

The foregoing relates to the preferred exemplary embodiments of the invention, it being understood that other variants and embodiments thereof are possible within the spirit and scope of the invention, the latter being defined by the appended claims.

The invention claimed is:

1. A pump element for installation in a pump bore of a hydraulic block, the pump element comprising:
   a pump piston;
   a restoring spring for the pump piston;
   an inlet valve with an inlet valve cap, the inlet valve cap having a high-pressure sealing portion;
   a closing spring and a closing body disposed in the inlet valve;
   a valve seat element that at least before installation of the pump element in the pump bore is connected to the pump piston by nonpositive engagement, and the high-pressure sealing portion rests with spring force reinforcement in an axial direction by the restoring spring on the valve seat element; and
   centering means provided for centering the inlet valve cap relative to the valve seat element.

2. The pump element as defined by claim 1, wherein between the inlet valve cap and the valve seat element, no nonpositive-engagement connection that absorbs tensile forces is provided.

3. The pump element as defined by claim 2, wherein the centering means include at least one chamfer, preferably on the valve seat element.

4. The pump element as defined by claim 3, wherein the restoring spring urges the valve seat element, before the installation of the pump element in the pump bore, axially against a filter element, into which the pump piston axially protrudes and which is connected, preferably by positive engagement, in particular by means of a detent connection, to a cylinder element which at least in some portions surrounds the restoring spring.

5. The pump element as defined by claim 4, wherein the nonpositive-engagement connection between the valve seat element and the pump piston is realized at least in part and preferably entirely via a radial force component, which results from an oblique contact face between the valve seat element and the filter element and from axial exertion of spring force on the valve seat element by the restoring spring.

6. The pump element as defined by claim 5, wherein the nonpositive-engagement connection between the pump piston and the valve seat element includes a pressure bond.

7. The pump element as defined by claim 2, wherein the restoring spring urges the valve seat element, before the installation of the pump element in the pump bore, axially against a filter element, into which the pump piston axially protrudes and which is connected, preferably by positive engagement, in particular by means of a detent connection, to a cylinder element which at least in some portions surrounds the restoring spring.

8. The pump element as defined by claim 7, wherein the nonpositive-engagement connection between the valve seat element and the pump piston is realized at least in part and preferably entirely via a radial force component, which results from an oblique contact face between the valve seat element and the filter element and from axial exertion of spring force on the valve seat element by the restoring spring.

9. The pump element as defined by claim 1, wherein the centering means include at least one chamfer, preferably on the valve seat element.

10. The pump element as defined by claim 9, wherein the restoring spring urges the valve seat element, before the installation of the pump element in the pump bore, axially against a filter element, into which the pump piston axially protrudes and which is connected, preferably by positive engagement, in particular by means of a detent connection, to a cylinder element which at least in some portions surrounds the restoring spring.

11. The pump element as defined by claim 10, wherein the nonpositive-engagement connection between the valve seat element and the pump piston is realized at least in part and preferably entirely via a radial force component, which results from an oblique contact face between the valve seat element and the filter element and from axial exertion of spring force on the valve seat element by the restoring spring.

12. The pump element as defined by claim 1, wherein the restoring spring urges the valve seat element, before the installation of the pump element in the pump bore, axially against a filter element, into which the pump piston axially protrudes and which is connected, preferably by positive engagement, in particular by means of a detent connection, to a cylinder element which at least in some portions surrounds the restoring spring.

13. The pump element as defined by claim 12, wherein the nonpositive-engagement connection between the valve seat element and the pump piston is realized at least in part and preferably entirely via a radial force component, which results from an oblique contact face between the valve seat element and the filter element and from axial exertion of spring force on the valve seat element by the restoring spring.

14. The pump element as defined by claim 1, wherein the nonpositive-engagement connection between the pump piston and the valve seat element includes a pressure bond.

15. The pump element as defined by claim 1, wherein the nonpositive-engagement connection between the pump piston and the valve seat element includes an adhesive bond.

16. A hydraulic block for a brake system of a motor vehicle, having a pump element as defined by claim 1 that is received in a pump bore.

17. A method of manufacturing a pump element comprising:
 axially thrusting an inlet valve cap with a high-pressure sealing portion onto an already-installed restoring spring for a pump piston;
 after that, axially introducing a closing spring and a closing body into the inlet valve cap; and
 after that, axially thrusting a valve seat element onto the inlet valve cap.

18. The method as defined by claim 17, wherein all the components of the pump element are installed in succession in an axial direction.

19. The method as defined by claim 17, wherein as the final installation step of the pump element before the introduction of the pump element into a pump bore in a hydraulic block, a filter element is thrust onto the pump piston and fixed by nonpositive engagement on a cylinder element that surrounds the restoring spring in at least some portions.

20. The method as defined by claim 17, wherein:
 the valve seat element, at least before installation of the pump element in a pump bore, is connected to the pump piston by nonpositive engagement,
 the high-pressure sealing portion rests with spring force reinforcement in an axial direction by the restoring spring on the valve seat element, and
 the pump element includes centering means configured to center the inlet valve cap relative to the valve seat element.

* * * * *